March 2, 1965 T. J. REINHART, JR 3,171,462
TOROIDAL PNEUMATIC TIRE

Filed Oct. 10, 1962 2 Sheets-Sheet 1

INVENTOR.
THEODORE J. REINHART, JR.
BY
ATTORNEYS

United States Patent Office 3,171,462
Patented Mar. 2, 1965

3,171,462
TOROIDAL PNEUMATIC TIRE
Theodore J. Reinhart, Jr., 4116 Woodedge Drive,
Bellbrook, Ohio
Filed Oct. 10, 1962, Ser. No. 229,766
13 Claims. (Cl. 152—355)
(Granted under Title 35, U.S. Code (1952), sec. 266)

The invention described herein may be manufactured and used by or for the Government for governmental purposes without the payment to me of any royalty thereon.

This invention relates to pneumatic tires having the general form of a toroid.

Tires made in accordance with the invention to be hereinafter disclosed are intended to provide an improved structure capable of overcoming many of the difficulties encountered when conventional tires are used on heavy-duty applications.

While not limited to such use, and for purposes of illustration, tires in accordance with this invention will be shown and described for use on aircraft.

Through the years, airplanes have become heavier, faster and more difficult to control. The present-day long range bomber is extremely heavy; and the landing impact on the tires is most destructive. Such bombers use triangle landing gears having tandem rear wheels in order to provide sufficient tire capacity to absorb the landing impact.

The airplane must make a perfect landing in order to utilize the full tire capacity on the airplane. A non-perfect landing is extremely detrimental in that the full impact shock must be absorbed by a portion of the tires. An extremely detrimental landing is one in which the airplane is canted; thus causing the full landing impact to fall on the outside tires on one side of the airplane. This type of landing pushes the bead of the tire away from the wheel flange, and on tubeless tires can cause a loss of air.

One important object of this invention is to provide a high strength tire in the form of a toroid.

A further object of this invention is to provide a tire having substantially uniform carcass strength.

Yet another object of this invention is to provide a tire configuration which eliminates conventional tire beads around which the loose ends of carcass fabrics must be wrapped.

A still further object of this invention is to provide a tire which cannot be deformed to produce a loss of air.

An additional object of this invention is to produce a tire configuration permitting more efficient use of metallic reinforcing filaments in the side wall areas.

Additional objects, advantages and features of the invention reside in the construction, arrangement and combination of parts involved in the embodiment of the invention as will appear from the following description and accompanying drawings, wherein.

Figures 1, 2:
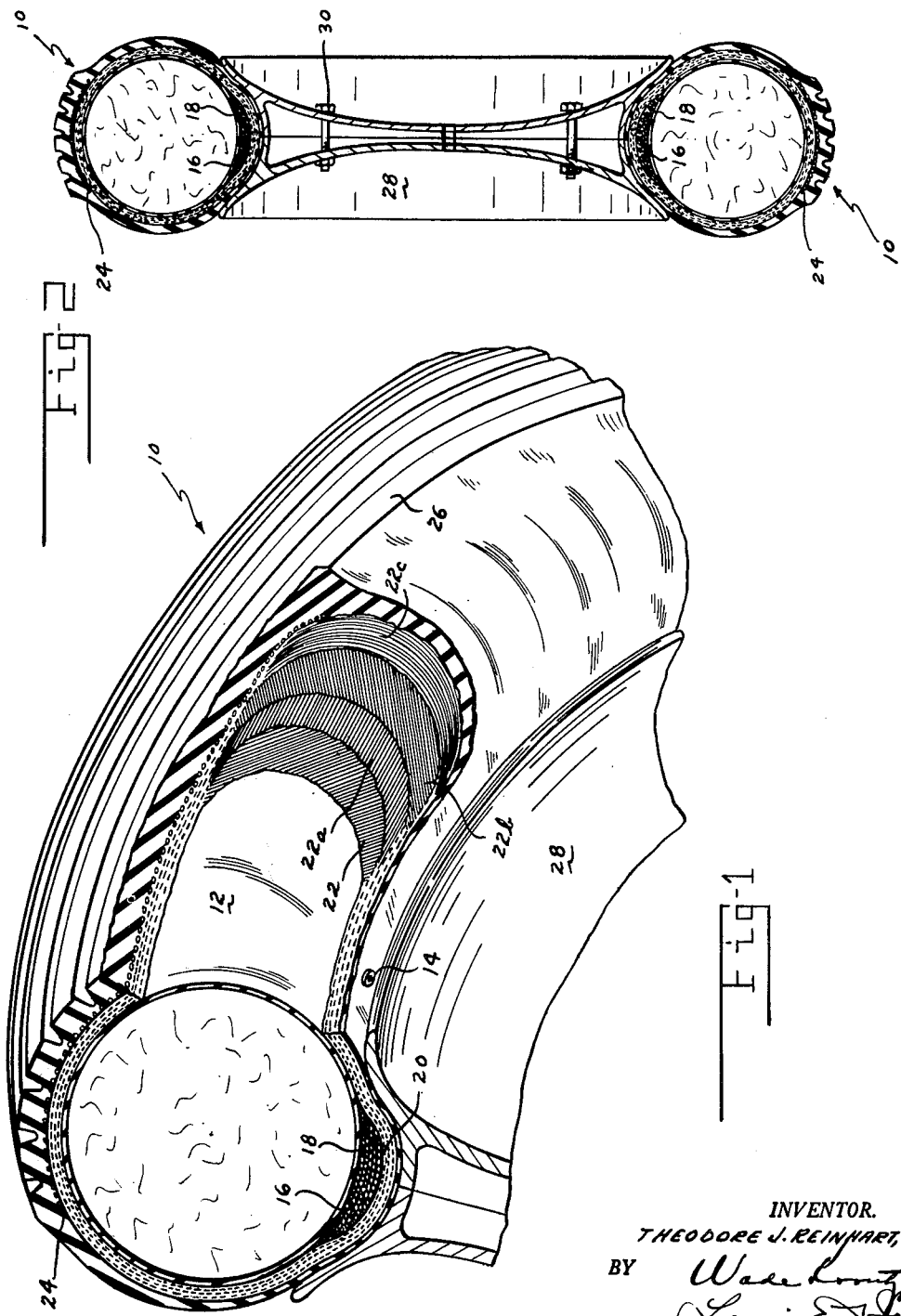
FIG. 1 is a perspective of a portion of the tire in operating relation to the wheel rim and partially broken to show construction details.
FIG. 2 is a cross-section through the tire and wheel.

Referring to the drawings, the tire referred to generally as tire 10 is in the form of a toroid. An air sealing inner tube 12, having an air valve 14, forms an inflatable mandrel on which the reinforcing plies are wound. Any foreign matter on the outer surface of the tube 12 is removed; after which the surface of the tube is primed with a suitable bonding agent such as rubber cement. A preformed flexible reinforcing ring 16, having a concave surface 18 mating the inner periphery of the outer surface on the inner tube, and a convex surface 20 of the general configuration of the wheel rim on which the tire is to be used, is placed as shown on FIG. 1.

The reinforcing ring may be of any suitable materials and construction suitable for providing a firm base for retaining the tire within the rim of the wheel on which it is to be mounted. One suitable form of reinforcing ring is made in the conventional manner of a plurality of wires insulated from each other by a cured rubberlike compound and fabric covered.

After the reinforcing ring 16 has been properly placed on the inner tube 12, the subassembly so formed is placed in a commercial winding machine which wraps a predetermined number of flexible plies. The plies are preferably formed of tapes made of calendered fabric of predetermined gauge and width which may or may not be impregnated with rubber-type insulating materials. The tapes are helically wrapped around the inner tube 12 and reinforcing ring 16 with butting or overlapping edges as shown on FIG. 3 to provide the desired number of layers or plies as shown by plies 22, 22a, 22b and 22c on FIG. 1. If desired, bonding materials may be applied between successive plies. The successive plies may be continuous wrapped from the same tape; or, the plies may be built up from several types of tape as, for example, a ply of fabric tape made of nylon followed by a ply of tape containing metallic wire, followed by another fabric tape. Likewise, the successive tapes may all be wrapped in the same direction, or a portion of the plies may be wrapped in opposite directions in crisscross fashion as shown on FIG. 4.

After all the plies are built-up around the inner tube and reinforcing ring, the subassembly so formed is removed from the wrapping machine. A flexible reinforcing breaker 24 is circumferentially applied to the crown of the subassembly as shown on the drawings. The breaker may be made and applied in a manner well-known to the tire art. Suitable tread compound 26 is then applied to encase or encompass the carcass so formed and the tire is then heat cured in a heated mold by the conventional manner which is well-known to the tire art.

In use, the completed tire may be mounted on a conventional split wheel 28, the two halves of which are held in place by bolts 30.

Figure 3:
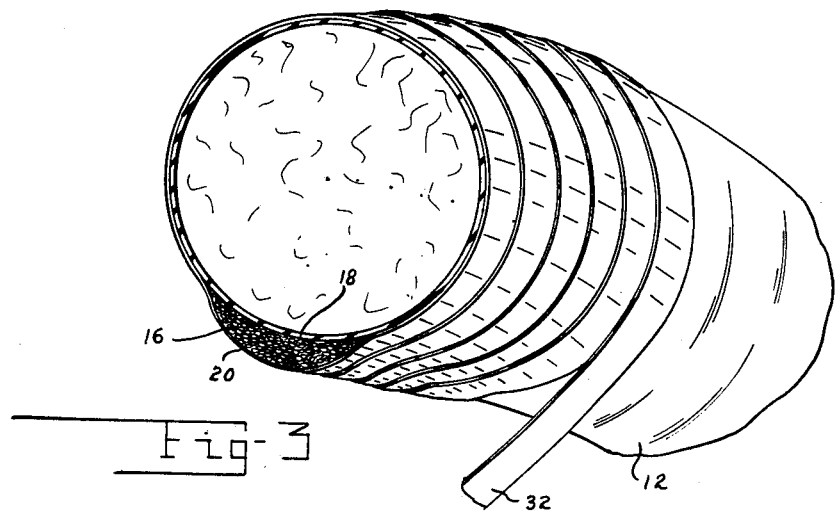
FIG. 3 shows the method of forming a typical ply from tape.
Figure 4:
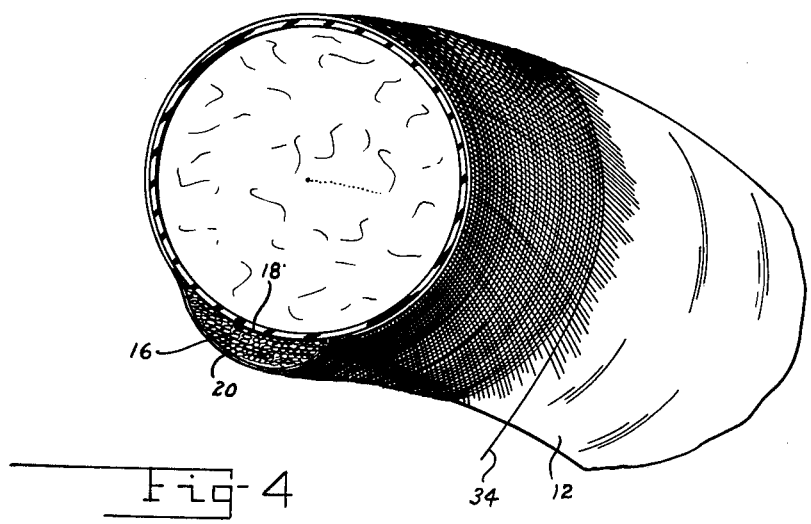
FIG. 4 shows, in exaggerated form for clarity, the method of forming adjacent plies from filaments.

A second embodiment of the invention uses filaments 34 as shown on FIG. 4 instead of the tapes 32 shown on FIG. 3. The filaments may be made of the same materials used to make the tapes. When forming the plies from filaments, it is preferable that alternate plies be wrapped in opposing directions about the carcass in criss-cross fashion in order to prevent intermingling of the filaments of one ply with the filaments of an adjacent ply.

One alternate method of forming the mandrel on which the tape is wrapped to form the plies of the tire carcass, is to fill the inner tube 12 through the air valve 14 with a suitable cold-hardening, soluble material such as the thermoplastic Rezolin manufactured by Rezolin Manufacturing Corporation. This material may be put into solution and flushed out of the tube after the tire has been formed. The net result of the alternate method over the first method of construction is to substitute a non-deformable mandrel for one having a degree of deformability.

A second alternate method of forming the mandrel is to cast or mold a toroidal form from soluble material such as the above-mentioned Rezolin. The material forming the inner tube 12 is then wrapped around the solidified form and all seams sealed and cured. After the tire is formed, the soluble material is flushed through the air valve 14.

Although, for purposes of illustration, the drawings show a tire of circular cross-section, other cross-sectional forms may be used; for example, an ellipsoidal form having its major axis parallel to the axis through the tire.

Tires made in accordance with this invention may be made from a variety of materials. For example, the tapes may contain natural and synthetic fibers as well as metallic threads. The tread compound likewise may be made of any suitable material, such as natural and synthetic rubber compounds in any desired combination.

It is to be understood that the embodiment of the present invention as shown and described is to be regarded as illustrative only and that the invention is susceptible to variations, modifications and changes, without regard to construction methods, within the scope of the appended claims.

I claim:

1. A pneumatic tire comprising: a carcass and tread compound encompassing said carcass, said carcass comprising an inner toroidal sealing member, a flexible reinforcing ring having a first concave surface adjacent to the inside diameter of said sealing member with the edges of the reinforcing ring blending with the adjoining surfaces of said sealing member and having a second convex surface opposite said concave surface, said convex surface being of the same general configuration as the tire supporting surface of the wheel on which the tire is to be mounted for use, and one or more flexible plies about said sealing member and said reinforcing ring.

2. A pneumatic tire comprising: a carcass and tread compound encompassing said carcass, said carcass comprising an inner toroidal sealing member, a flexible reinforcing ring, one or more flexible plies about said sealing member and said reinforcing ring, and a flexible breaker circumferentially applied to the crown of the subassembly formed by said sealing member, reinforcing ring and plies; said reinforcing ring comprising a plurality of wire loops buried and insulated within a rubber-like material having a first concave surface adjacent to the inside diameter of said sealing member with the edges of the reinforcing ring blending with the adjoining surfaces of said sealing member and having a second convex surface opposite said concave surface, said convex surface being of the same general configuration as the tire supporting surface of the wheel on which the tire is to be mounted for use, said plies being formed of fabric and ductile metallic wire insulated in rubber-like material, said breaker being formed of fabric and metallic wire insulated in rubber-like material.

3. A pneumatic tire comprising: a carcass and tread compound encompassing said carcass, said carcass comprising an inner toroidal sealing member, a flexible reinforcing ring adjacent to the inside diameter of said sealing member, and at least one flexible ply comprising a tape helically wrapped about said sealing member and said reinforcing ring.

4. A pneumatic tire comprising: a carcass and tread compound encompassing said carcass, said carcass comprising an inner toroidal sealing member, a flexible reinforcing ring adjacent to the inside diameter of said sealing member, and at least two flexible plies comprising tapes helically wrapped about said sealing member and said reinforcing ring; at least one of said tapes being helically wrapped in one direction and the remainder of said tapes being helically wrapped in the opposite direction.

5. A pneumatic tire comprising: a carcass and tread compound encompassing said carcass, said carcass comprising an inner toroidal sealing member, a flexible reinforcing ring having a first concave surface adjacent to the inside diameter of said sealing member with the edges of the reinforcing ring blending with the adjoining surfaces of said sealing member and having a second convex surface opposite said concave surface, said convex surface being of the same general configuration as the tire supporting surface of the wheel on which the tire is to be mounted for use, at least two flexible plies about said sealing member and said reinforcing ring, and a breaker circumferentially applied to the crown of the subassembly formed by said sealing member, reinforcing ring and plies; said plies comprising tapes helically wrapped about said sealing member and said reinforcing ring, at least one of said tapes being helically wrapped in one direction and the remainder of said tapes being helically wrapped in the opposite direction.

6. A pneumatic tire comprising: a carcass and tread compound encompassing said carcass, said carcass comprising an inner toroidal sealing member, a flexible reinforcing ring, at least one flexible ply about said sealing member and said reinforcing ring, and a flexible breaker circumferentially applied to the crown of the subassembly formed by said sealing member, reinforcing ring and plies; said reinforcing ring comprising a plurality of wire loops buried and insulated within a rubber-like material having a first concave surface adjacent to the inside diameter of said sealing member with the edges of the reinforcing ring blending with the adjoining surfaces of said sealing member and having a second convex surface opposite said concave surface, said convex surface being of the same general configuration as the tire supporting surface of the wheel on which the tire is to be mounted for use; said plies comprising a tape helically wrapped about said sealing member and said reinforcing ring.

7. A pneumatic tire comprising: a carcass and tread compound encompassing said carcass, said carcass comprising an inner toroidal sealing member, a flexible reinforcing ring, at least two flexible plies about said sealing member and said reinforcing ring, and a flexible breaker circumferentially applied to the crown of the subassembly formed by said sealing member, reinforcing ring and plies; said reinforcing ring comprising a plurality of wire loops buried and insulated within a rubber-like material having a first concave surface adjacent to the inside diameter of said sealing member with the edges of the reinforcing ring blending with the adjoining surfaces of said sealing member and having a second convex surface opposite said concave surface, said convex surface being of the same general configuration as the tire supporting surface of the wheel on which the tire is to be mounted for use; said plies comprising tapes helically wrapped about said sealing member and said reinforcing ring, at least one of said tapes being helically wrapped in one direction and the remainder of said tapes being helically wrapped in the opposite direction.

8. A pneumatic tire substantially in accordance with claim 6 and in which said breaker is formed of fabric and metallic wire insulated in rubber-like material.

9. A pneumatic tire substantially in accordance with claim 7 and in which said breaker is formed of fabric and metallic wire insulated in rubber-like material.

10. A pneumatic tire comprising: a carcass and tread compound encompassing said carcass, said carcass comprising an inner toroidal sealing member, a flexible reinforcing ring, at least one flexible ply about said sealing member and said reinforcing ring, and a flexible breaker formed of fabric and metallic wire insulated in rubber-like material and circumferentially applied to the crown of the subassembly formed by said sealing member, reinforcing ring and plies; said reinforcing ring comprising a plurality of wire loops buried and insulated within a rubber-like material having a first concave surface adjacent to the inside diameter of said sealing member with the edges of the reinforcing ring blending with the adjoining surfaces of said sealing member and having a second convex surface opposite said concave surface, said convex surface being of the same general configuration as the tire supporting surface of the wheel on which the tire is to be mounted for use; said plies comprising a tape formed of fabric and ductile metallic wire insulated in rubber-like material and helically wrapped about said sealing member and said reinforcing ring.

11. A pneumatic tire comprising: a carcass and tread compound encompassing said carcass, said carcass comprising an inner toroidal sealing member, a flexible reinforcing ring adjacent to the inside diameter of said sealing member, and at least two flexible plies comprising filaments helically wrapped about said sealing member and said reinforcing ring; the filaments forming adjacent plies being wrapped in opposite directions in criss-cross fashion.

12. A pneumatic tire comprising: a carcass and tread compound encompassing said carcass, said carcass comprising an inner toroidal sealing member, a flexible reinforcing ring having a first concave surface adjacent to the inside diameter of said sealing member with the edges of the reinforcing ring blending with the adjoining surfaces of said sealing member and having a second convex surface opposite said concave surface, said convex surface being of the same general configuration as the tire supporting surface of the wheel on which the tire is to be mounted for use, at least two flexible plies about said sealing member and said reinforcing ring, and a breaker circumferentially applied to the crown of the subassembly formed by said sealing member, reinforcing ring and plies; said plies comprising filaments toroidally wrapped about said sealing member and said reinforcing ring, the filaments forming adjacent plies being wrapped in opposite directions in criss-cross fashion.

13. A pneumatic tire comprising: a carcass and tread compound encompassing said carcass, said carcass comprising an inner toroidal sealing member, a flexible reinforcing ring, at least two flexible plies about said sealing member and said reinforcing ring, and a flexible breaker circumferentially applied to the crown of the subassembly formed by said sealing member, reinforcing ring and plies; said reinforcing ring comprising a plurality of wire loops buried and insulated within a rubber-like material having a first concave surface adjacent to the inside diameter of said sealing member with the edges of the reinforcing ring blending with the adjoining surfaces of said sealing member and having a second convex surface opposite said concave surface, said convex surface being of the same general configuration as the tire supporting surface of the wheel on which the tire is to be mounted for use; said plies comprising filaments helically wrapped about said sealing member and said reinforcing ring, the filaments forming adjacent plies being wrapped in opposite directions in criss-cross fashion.

References Cited by the Examiner

UNITED STATES PATENTS

| 467,642 | 1/92 | Palmer | 152—354 X |
| 924,571 | 6/09 | Palmer | 152—354 |
| 1,062,401 | 5/13 | Johnson et al. | 152—354 |
| 1,513,900 | 11/24 | Flood | 156—121 |
| 1,619,119 | 3/27 | Hastings | 156—121 |
| 2,782,830 | 2/57 | Wallace | 152—355 |

FOREIGN PATENTS

| 84,853 | 1/20 | Austria. |
| 1,071,788 | 3/54 | France. |
| 14,573 | 1903 | Great Britain. |

ARTHUR L. LA POINT, *Primary Examiner.*

ROBERT C. RIORDON, *Examiner.*